United States Patent Office 2,767,993
Patented Oct. 23, 1956

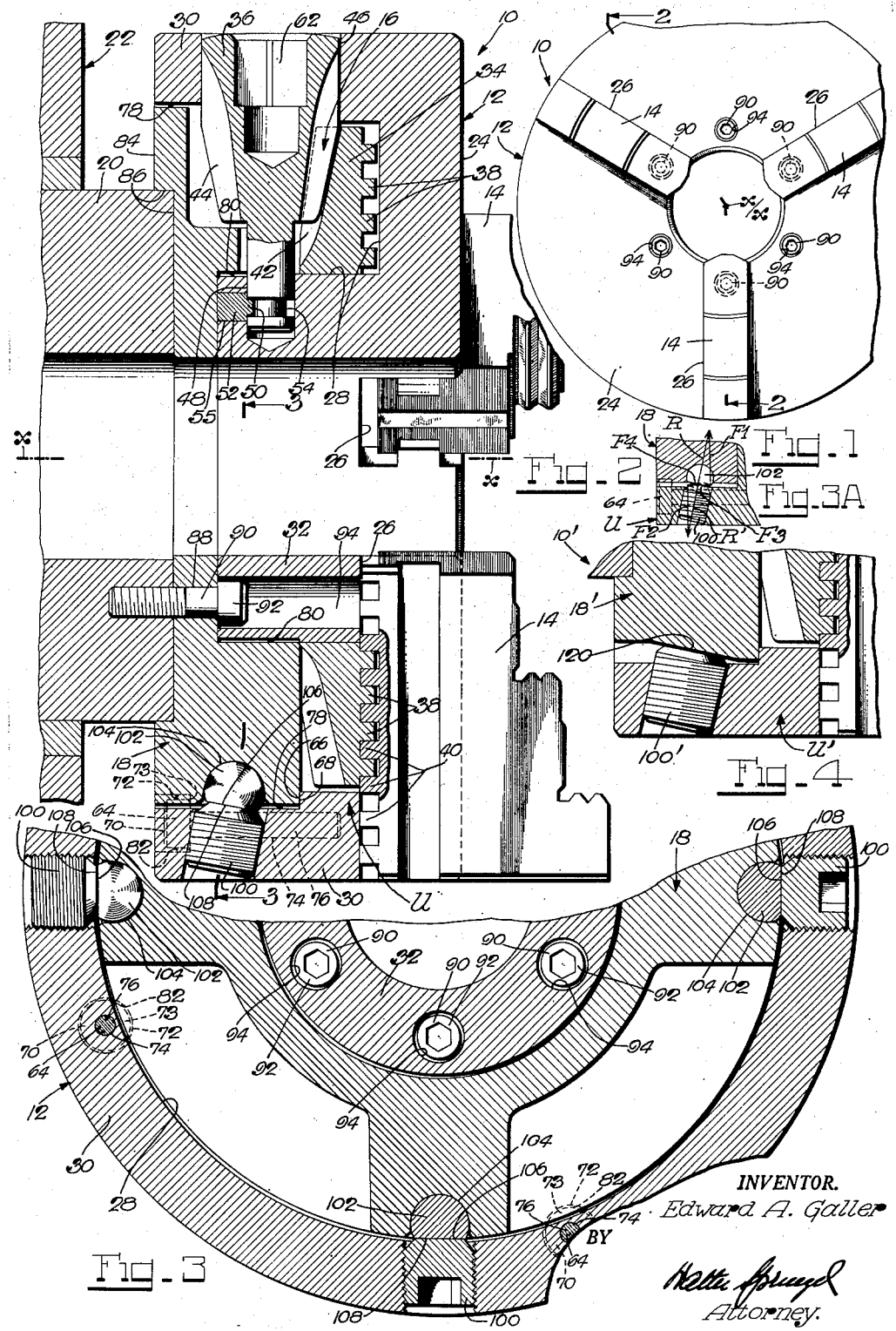

2,767,993

UNIVERSAL CHUCK OF THE CENTER-ADJUSTABLE AND SELF-LOCKING TYPE

Edward A. Galler, Windsor, Conn., assignor to The Cushman Chuck Company, Hartford, Conn., a corporation of Connecticut Application June 27, 1955, Serial No. 518,167

18 Claims. (Cl. 279—116)

This invention relates to chucks in general, and to universal chucks of the center-adjustable type in particular.

Universal chucks of this type are characterized by a chuck aggregate which customarily comprises a chuck body with movable work-gripping jaws thereon and scroll-type jaw-operating means therein, and a mounting adapter which is fixedly mounted on a support, such as the power spindle of a lathe or other machine tool, and on which the chuck aggregate is in turn mounted for center-adjustment thereon. Customarily, the chuck aggregate and mounting adapter, conveniently referred to hereinafter as "chuck unit" and "adapter unit," are held in their assembled relation by holding screws which exert a clamping force on abutting surfaces of these units and have such relative clearance from the latter as to permit relative sliding of these surfaces on each other for center-adjustment of the chuck unit on the adapter unit. Center-adjustment of the chuck unit on the adapter unit is customarily achieved by turning readily accessible set screws which are received in one unit and bear against the other unit. Due to the limited surface engagement areas at a few widely spaced places between these set screws and the associated unit, the former offer little resistance to torsional operating stresses in the chuck unit unless they are prohibitively tightened and entail immediate and excessive wear of the same and of the unit engaged thereby. To avoid such excessive wear of the set screws and associated unit, the aforementioned clamping force exerted by the holding screws on the units is customarily relied on to transmit most, if not all, operating stresses from the chuck unit to the adapter unit. This requires, however, that the holding screws are loosened and retightened prior and subsequent to a center-adjustment of the chuck unit on the adapter unit, with the result that the over-all task of center-adjusting is not only time-consuming but burdensome as well, especially since the holding screws are customarily arranged in back of the chuck and, hence, not too easily accessible. Moreover, center-adjustment of the chuck unit on the adapter unit by one set of screws while the units are connected relatively loosely, and subsequent tightening of the connection between the units by another set of screws, is inherently non-conducive to achieving optimum accuracy in fixing the adjustment, with the result that accurate center-adjustment of the chuck unit on the adapter unit was heretofore achieved mostly after repeated trial and error and in any event with considerable skill only.

It is the primary aim and object of the present invention to provide a universal chuck of this type which has none of the aforementioned deficiencies of prior chucks of this type, and which greatly facilitates the task of accurately center-adjusting the chuck unit on the adapter unit.

It is, therefore, an object of the present invention to provide a universal chuck of this type which even with the exercise of ordinary skill permits center-adjustment of the chuck unit on the adapter unit and locking of the former in its accurately adjusted position to the latter in one attempt rather than on repeated trial and error as heretofore.

It is another object of the present invention to provide a universal chuck of this type which permits the aforementioned center-adjustment of the chuck unit on the adapter unit and its lock in accurately adjusted position to the latter in one attempt, without requiring loosening and retightening of the aforementioned holding screws as heretofore.

It is a further object of the present invention to provide a universal chuck of this type in which the clamping force between the units is chiefly or solely relied on, as heretofore, to transmit all operational stresses from the chuck unit to the adapter unit in order to keep wear of the set screws and of the unit engaged thereby at a minimum, yet to achieve a considerable reduction of this clamping force from its normal magnitude and restoration of the same to its normal magnitude for effortless adjustment of the chuck unit on the adapter unit and renewed firm lock thereon in adjusted position, not by manipulating the aforementioned holding screws in any way but rather in response to manipulation of the set screws for releasing the chuck unit for, and inching it into, adjustment on the adapter unit and on fixing the adjustment of the chuck unit.

Another object of the present invention is to provide a universal chuck of this type in which the set screws are so arranged with respect to the unit engaged thereby that they will on their manipulation not only cause the aforementioned responsive variation in the magnitude of the clamping force between the units, but will gradually restore this clamping force to its normal magnitude as the reactive forces from the engaged unit against these set screws increase, thereby permitting reliable inching of the chuck unit on the adapter unit in a minimum number of steps and directions best suited for achieving most direct adjustment of the former into most accurate center position without any danger of spoiling the accurate adjustment on final tightening of the set screws.

A further object of the present invention is the provision of a universal chuck of this type in which the aforementioned holding screws may remain tightened to such an extent that the clamping force exerted thereby between the units will permit adjustment of the chuck unit on the adapter unit on rather effortless manipulation of the set screws, and the latter are so inclined to the longitudinal chuck axis that on their manipulation the resultant forces thereof on the unit engaged thereby have major components radially of the chuck axis for moving the chuck unit on the adapter unit into adjusted position thereon, and minor components parallel to the chuck axis which, on arrest by the set screws of the chuck unit against further movement on the adapter unit, simultaneously augment the clamping force between the units from the holding screws sufficiently so that the over-all clamping force between these units is for normal operation of the chuck assuredly adequate to transmit most, if not all, operational stresses from the chuck unit directly to the adapter unit and thereby keep wear of the set screws and of the unit engaged thereby at a minimum.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary front view of a universal chuck embodying the present invention;

Fig. 2 is an enlarged section through the same chuck as taken substantially on the line 2—2 of Fig. 1;

Fig. 3 is another fragmentary section through the same chuck as taken on the line 3—3 of Fig. 2;

Fig. 3A is a diagrammatic view showing the relation of the vectors of certain forces in the chuck; and Fig. 4 is a section through a part of a universal chuck embodying the present invention in a modified manner.

Referring to the drawings, and more particularly to Figs. 1 to 3 thereof, the reference numeral 10 designates a universal chuck of the center-adjustable type, comprising a body 12 with work-gripping jaws 14 and jaw-operating mechanism 16, and an adapter disc 18 by means of which the chuck body with its parts 14 and 16 is adjustably mounted on the power spindle 20 of a lathe or other machine tool 22 (Fig. 2).

The chuck body 12, being of usual cylindrical form, is in its front face 24 provided with equi-angularly spaced radial guideways 26 for the jaws 14, and is in its rear provided with a ring-shaped recess 28, leaving the chuck body with a rearwardly extending peripheral skirt 30 and a central hub 32, both arranged concentrically with respect to the longitudinal chuck axis x—x.

The jaw-operating mechanism comprises, in the present instance, a conventional scroll disc 34 and a pinion 36 of which the former is received in the rear recess 28 in the chuck body 12 and journalled on the central hub 32 thereof. The disc 34 is at its front provided with scroll-like ribs or teeth 38 which mesh with similarly formed teeth 40 in back of the jaws 14 and move the latter toward and away from the chuck center x—x on rotation of the disc 34 in opposite directions, as will be readily understood. The disc 34 is at its rear provided with bevel teeth 42 that are in mesh with similar teeth 44 of the pinion 36 which is journalled at 46 and 48 in the skirt 30 and hub 32, respectively, of the chuck body 12. In order to hold the pinion 36 against axial escape from the chuck body 12, the key end 50 of a retainer pin 52 projects into a peripheral groove 54 in the pinion 36. The retainer pin 52 is received, preferably with a sliding fit, in a bore 55 in the end of the central hub 32 of the chuck body 12. As usual, the pinion 36 is located within the peripheral confines of the chuck body 12 (Fig. 2), and is provided with a socket 62 for the reception of a suitable tool, such as an Allen wrench, for instance, with which to turn the pinion and, hence, the scroll disc 34, for operating the jaws 14.

In the present exemplary chuck 10, the adapter disc 18, by means of which the chuck is adjustably mounted on the power spindle 20 of a lathe as already mentioned, forms also a separate but complementary part of the chuck body 12 in that it serves also as a retainer for the scroll disc 34 to keep it in cooperative relation with the jaws 14. To this end, the chuck body 12 is directly mounted on the adapter disc 18 for universal adjustment thereon within limits in a plane normal to the chuck axis x—x. This is achieved by mounting the chuck body 12 on the adapter disc 18 by means of a plurality of screws 64, for instance, which are threadedly received in the end of the skirt 30 of the chuck body 12, while their heads 70 are received in complementary parts of annular recesses 72 in the body skirt 30 and adapter disc 18 and seated on the complementary bottom parts of these recesses, or at least on the bottoms 73 of the recess parts formed in the adapter disc, so as to hold the front face 66 of the latter on an annular shoulder 68 in the body skirt 30 in clamping engagement therewith, yet with only such force as to permit forced adjustment of the chuck body 12 on the adapter disc 18 in a manner to be described. To this end, the drilled holes 74 in the body skirt 30 which are subsequently tapped for the reception of the threaded shanks 76 of the screws 64, may be counterbored to provide the recesses 72 for the screw heads 70 when the adapter disc 18 is with its front face 66 seated fully, or nearly so, on the annular shoulder 68 in the body skirt 30. Universal adjustment of the chuck body 12 with its jaws 14 and jaw-operating mechanism 16 as a unit U on the adapter disc 18, on the relatively slidable surfaces 66 and 68 of the disc 18 and body skirt 30 on the one hand and the bottoms 73 of the parts of the recesses 72 in the disc 18 and the parts of the screw heads 70 seated thereon, is limited by the clearances 78 and 80 between the chuck body 12 and adapter disc 18 and by the clearances 82 between the recesses 72 and the screw heads 70 received therein (Fig. 2).

The adapter disc 18 has also suitable provisions for its rearward attachment to the power spindle 20 of the lathe or other machine tool 22. In the present example, the rear face 84 of the adapter disc 18 is provided with an annular recess 86 for the fitted reception of the front end of the power spindle 20, thus accurately locating the adapter disc on the power spindle. Further, the adapter disc 18 is provided with a plurality of holes 88 for the reception of mounting screws 90 which are threadedly received in the power spindle 20. The heads 92 of the mounting screws 90 project into through-holes 94 in the chuck body 12 through which they are accessible from the front of the chuck. The holes 94 in the chuck body 12 are sufficiently large to admit a suitable wrench to the screw heads 92 in any adjusted position of the chuck unit U on the adapter disc 18, as well as to provide sufficient clearance from these screw heads to permit universal adjustment of the chuck unit U on the adapter disc 18 within the aforementioned limits.

Received in the rear skirt 30 of the chuck body 12 are a plurality, in this instance four, equi-angularly spaced set screws 100 which on being turned in appropriate directions react with the adapter disc 18 in adjusting the chuck unit U on the latter into any one of an infinite number of positions thereon within the limits imposed by the aforementioned clearances between the chuck unit and adapter disc. In the present example, the set screws 100 do not react directly with the adapter disc 18, but rather through intermediation of ball-type links 102 in the manner shown and described in the copending application of Harry E. Sloan, Serial No. 518,013 filed June 27, 1955. Thus, equi-angularly spaced part-spherical sockets 104 of a number equal to that of the set screws 100 are machined into the periphery of the adapter disc 18, and the ball-type links 102, hereafter referred to simply as "balls," are seated and turnable in these sockets. Significantly, each of these balls 102 has a cutaway surface 106 which is preferably a machined flat, while the adjacent end surface 108 of the associated set screw 100 is similarly flat and preferably accurately machined in order uniformly to engage the flat surface 106 on the adjacent ball 102 throughout its area in the fashion shown in Figs. 2 and 3.

Whenever for any reason whatever, such as wear of any one or more of the parts of the instant chuck, it becomes necessary to re-center the chuck on the power spindle 20 by adjusting the chuck unit U on the adapter disc 18 through manipulation of the set screws 100, as described, the flat end surfaces 108 of the latter will remain in full contact with the flats 106 on the associated balls 102 throughout the adjustment as well as thereafter. This is due to the fact that the balls 102, being free to turn in their respective sockets 104 and also slide with their flats 106 on the flat end surfaces 108 of the adjacent set screws 100, will readily adjust themselves to any position of the chuck unit on the adapter disc within the prescribed limits without losing full contact of their flats with the flat end surfaces of the adjacent set screws. This holds true even when adjustment of the chuck unit U on the adapter disc is accompanied by a slight rotational component motion of the chuck unit, as is the case in most adjustments. In thus achieving unfailing and full surface-to-surface contact between the balls 102 and set screws 100 during any adjustment of the chuck unit U on the adapter disc 18 as well as in any adjusted position of the former on the latter, it stands to reason that the flats 106 on the balls and the flat end surfaces 108 of the set screws are subjected to hardly any wear for a long period of time which may well extend to the life of the chuck. Furthermore, even if the flats 106 of the balls 102 and the flat end surfaces 108 of the set screws 100 should show some slight wear due to their sliding on each other in consequence of numerous adjustments of the chuck unit on the adapter disc, such wear would be substantially uniform throughout their areas and, hence, not in the least detrimental to further accurate adjustments of the chuck unit and the ability of the balls and set screws safely and reliably to transmit for an indefinite length of time such operational stresses from the chuck unit to the adapter disc which are not directly transmitted by virtue of their clamping engagement with each other by the force of the holding screws 64.

The exemplary chuck described so far is in all major respects like or similar to one form of chuck shown and described in the aforementioned copending application of Harry E. Sloan, Serial No. 518,013 and hence forms no part of the present invention.

The present invention deals with a unique feature according to which the force with which the chuck unit U and adapter disc 18 are clamped to each other is automatically variably controlled to the end that this clamping force is considerably reduced in magnitude for adjustment of the chuck unit on the adapter disc and is restored to its full magnitude after such adjustment is concluded, all in response to manipulation of the set screws 100 and without in any way manipulating the holding screws 64. This is achieved by arranging the set screws 100 so that they axially extend inclined to the chuck axis $x$—$x$ to form acute angles therewith (Fig. 2). In thus arranging the set screws 100, they will on their inward drive exert on the adapter disc 18 and chuck unit U reactive forces R and R' (Fig. 3A) which have reactive components $F^1$ and $F^2$ whose opposed vectors extend at right angles to the chuck axis $x$—$x$ and, hence, constitute forces, called "adjustment" forces, which cooperate to cause movement of the chuck unit on the adapter disc for adjustment of the former on the latter, and further reactive components $F^3$ and $F^4$ whose opposed vectors extend parallel to the chuck axis $x$—$x$ and, hence, constitute forces, called "binding" forces, which cooperate to clamp the chuck unit to the adapter disc. Since in the preferred use of the chuck the unit U and adapter disc 18 remain clamped together with some force by the holding screws 64 even when any or all set screws 100 should be loosened for an adjustment of the chuck unit, it being contemplated not to loosen the holding screws 64 for this purpose, the inclination of the set screws 100 to the chuck axis $x$—$x$ must under the circumstances be such that the aforementioned adjustment forces $F^1$ and $F^2$ are greater than the frictional resistance encountered by the chuck unit and adapter disc on each other by virtue of the clamping forces exerted on the same by the holding screws 64 and the aforementioned additive binding forces $F^3$ and $F^4$, as otherwise the chuck unit would bind on the adapter disc on manipulation of the loosened set screws 100 for an intended adjustment of the chuck unit. This is readily accomplished by arranging the set screws 100 so that their axes form with the chuck axis $x$—$x$ acute angles of more than 45 degrees, and preferably considerably more than 45 degrees.

The angles of inclination of the set screws 100 with the chuck axis $x$—$x$ are preferably identical and such that, with the holding screws 64 tightened to clamp the chuck unit to the adapter disc with reasonable firmness, the loosened set screws 100 will on manipulation shift the chuck unit on the adapter disc without undue effort despite the ever-present binding forces $F^3$ and $F^4$ which, however, are of smal magnitude while adjustment of the chuck unit by some of the set screws takes place and is not opposed by the other set screws. However, as further adjustment of the chuck unit on the adapter disc is being opposed by any of the set screws on continued manipulation of another set screw or screws, as may occur in step-by-step inching of the chuck unit toward its new position on the adapter disc and will occur on concluding the adjustment of the former before tightening all set screws thereon, the aforementioned binding forces $F^3$ and $F^4$ will increase rapidly and sufficiently augment the clamping force exerted by the holding screws 64 on the chuck unit and adapter disc to transmit most, if not all, operational stresses from the former directly to the latter rather than by way of the balls 102 and set screws 100.

The described inclination of the set screws 100 with respect to the chuck axis $x$—$x$ secures several other important advantages. Thus, the reduction of the magnitude of the overall clamping force on the chuck unit and adapter disc or unit in response to manipulation of the set screws for an adjustment of the chuck unit on the adapter unit and the subsequent restoration of this overall clamping force to its full magnitude on conclusion of the adjustment, permits in the first place adjustment of the chuck unit without loosening the holding screws 64 and, hence, without encountering the slightest disturbing play or looseness in the connection between the units, yet without experiencing undue resistance in the manipulation of the set screws. This is, of course, highly advantageous not only because the entire adjustment of the chuck unit and its secure lock in adjusted position is achieved in the simplest and easiest possible manner by manipulating only one set of screws, namely, the set screws 100, but also because the adjustment takes place under relatively tight surface-to-surface conditions between the units which are best suited to hold the chuck unit in any adjusted position with the greatest accuracy and prevent any give of the same from its adjusted position on locking it to the adapter disc simultaneously with the conclusion of the adjustment. Also, adjustment of the chuck unit under the aforementioned relatively tight surface-to-surface conditions between the units permits successful single-attempt inching of the chuck unit into accurately centered position on the adapter unit, for any adjusted position of the chuck unit becomes without fail its firmly fixed position on merely tightening the set screws, thereby not only eliminating all previous trial-and-error adjustment of the chuck unit but also achieving accurate adjustment of the latter in a shorter time and with the exercise of less skill than heretofore.

While the present invention has been demonstrated on a chuck having the advantageous ball links 102 between the set screws 100 in the chuck unit U and the adapter disc 18, the same invention may with all the aforementioned advantages be applied to any other conventional universal chuck of the center-adjustable type. Thus, Fig. 4 shows a chuck 10' the adapter disc or unit 18' of which is devoid of ball links, and instead is provided with a frusto-conical formation 120 with which the inclined set screws 100' in the chuck unit U' cooperate.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a universal chuck of the center-adjustable type having a chuck unit with a longitudinal axis, and an adapter unit having provisions for its attachment to a support and carrying said chuck unit for limited relative sliding movement thereon in any direction in a plane normal to said axis, the combination of a plurality of set screws in one of said units angularly spaced about said axis and axially extending inclined to the latter to form acute angles therewith; and surfaces on the other unit arranged for engagement by the adjacent ends of said screws, respectively, along lines substantially at right angles to the axes of the latter and inclined to said unit axis to form angles therewith, said set screws being turnable to adjust said chuck unit on said adapter unit and clamp the former in any adjusted position to the latter.

2. The combination in a universal chuck of the center-adjustable type as set forth in claim 1, in which said set screws are inclined to said unit axis to form identical acute angles therewith.

3. The combination in a universal chuck of the center-adjustable type as set forth in claim 1, in which said set screws are inclined to said unit axis to form therewith acute angles of more than 45 degrees.

4. The combination in a universal chuck of the center-adjustable type as set forth in claim 1, in which said set screws are inclined to said unit axis to form therewith identical acute angles of more than 45 degrees.

5. The combination in a universal chuck of the center-adjustable type as set forth in claim 1, in which said adapter unit extends into said chuck unit and the latter carries said set screws accessible at the outside thereof.

6. In a universal chuck of the center-adjustable type having a chuck unit with a longitudinal axis, and an adapter unit having provisions for its attachment to a support and carrying said chuck unit for limited relative sliding movement thereon in any direction in a plane normal to said axis, the combination of a plurality of set screws in one of said units angularly spaced about said axis and axially extending inclined to the latter to form acute angles therewith; and surfaces on the other unit arranged for engagement by the adjacent ends of said screws, respectively, in planes substantially normal to the axes of the latter, said set screws being turnable to adjust said chuck unit on said adapter unit and clamp the former in any adjusted position to the latter.

7. In a universal chuck of the center-adjustable type having a chuck unit with a longitudinal axis, and an adapter untill having provisions for its attachment to a support and surface means on which said chuck unit is slidable in any direction in a plane normal to said axis, the combination of means clamping said chuck unit to said surface means of said adapter unit; a plurality of set screws in one of said units angularly spaced about said axis and axially extending inclined to the latter to form acute angles therewith; and surfaces on the other unit arranged for engagement by the adjacent ends of said screws, respectively, in planes substantially normal to the axes of the latter, said set screws being turnable to adjust said chuck unit on said adapter unit and clamp the former in any adjusted position to said surface means with a force which augments the clamping force exerted by said clamping means.

8. The combination in a universal chuck of the center-adjustable type as set forth in claim 7, in which said clamping means are screw devices for exerting a variable clamping force on said chuck unit and surface means.

9. The combination in a universal chuck of the center-adjustable type as set forth in claim 7, in which said set screws are inclined to said unit axis to form therewith acute angles of more than 45 degrees.

10. The combination in a universal chuck of the center-adjustable type as set forth in claim 7, in which said adapter unit extends into said chuck unit and the latter carries said set screws accessible at the outside thereof.

11. In a universal chuck of the center-adjustable type having a chuck unit with a longitudinal axis, and an adapter unit having provisions for its attachment to a support and carrying said chuck unit for limited relative sliding movement thereon in any direction in a plane normal to said axis, the combination of a plurality of set screws in one of said units angularly spaced about said axis and axially extending inclined to the latter to form identical acute angles therewith pointing in one direction axially of said chuck unit; and a frusto-conical surface on the other unit about said unit axis, said surface decreasing in diameter in a direction opposite to said one direction and being normally engaged by the adjacent ends of said set screws, and said set screws being turnable to adjust said chuck unit on said adapter unit and clamp the former in any adjusted position to the latter.

12. In a universal chuck of the center-adjustable type having a chuck unit with a longitudinal axis, and an adapter unit having provisions for its attachment to a support and carrying said chuck unit for limited relative sliding movement thereon in any direction in a plane normal to said axis, the combination of a plurality of sockets in one of said units angularly spaced about said axis; balls seated and turnable in said sockets, respectively; and set screws in the other unit engaging with their end surfaces said balls, respectively, and axially extending inclined to said unit axis to form acute angles therewith, each of said balls being in part cut-away and the cutaway surfaces of said balls and respective engaging end surfaces of said set screws being so mated that they remain in uniform engagement with and relatively slide on each other on adjustment of said chuck unit on said adapter unit, and said set screws being turnable to adjust said chuck unit on said adapter unit and clamp the former in any adjusted position to the latter.

13. The combination in a universal chuck of the center-adjustable type as set forth in claim 12, in which said mating surfaces of said balls and set screws are flat.

14. The combination in a universal chuck of the center-adjustable type as set forth in claim 12, in which said adapter unit extends into said chuck unit and the latter carries said set screws accessible at the outside thereof.

15. In a universal chuck of the center-adjustable type having a chuck unit with a longitudinal axis, and an adapter unit having provisions for its attachment to a support and surface means on which said chuck unit is slidable in any direction in a plane normal to said axis, the combination of means clamping said chuck unit to said surface means of said adapter unit; a plurality of sockets in one of said units angularly spaced about said axis; balls seated and turnable in said sockets, respectively; and set screws in the other unit engaging with their end surfaces said balls, respectively, and axially extending inclined to said unit axis to form acute angles therewith, each of said balls being in part cut-away and the cutaway surfaces of said balls and respective engaging end surfaces of said set screws being so mated that they remain in uniform engagement with and relatively slide on each other on adjustment of said chuck unit on said adapter unit, and said set screws being turnable to adjust said chuck unit on said adapter unit and clamp the former in any adjusted position to said surface means with a force which augments the clamping force exerted by said clamping means.

16. The combination in a universal chuck of the center-adjustable type as set forth in claim 15, in which said mating surfaces of said balls and set screws are flat.

17. The combination in a universal chuck of the center-adjustable type as set forth in claim 15, in which said clamping means are screw devices for exerting a variable clamping force on said chuck unit and surface means.

18. The combination in a universal chuck of the center-adjustable type as set forth in claim 15, in which said set screws are inclined to said unit axis to form therewith acute angles of more than 45 degrees.

No references cited.